(12) United States Patent
Marche (10) Patent No.: US 8,496,202 B2
(45) Date of Patent: Jul. 30, 2013

(54) HYDRAULIC SYSTEM FOR TRANSMISSION OF FORCES BETWEEN AN AIRCRAFT TURBOPROP AND AN ATTACHMENT DEVICE

(75) Inventor: Jacques Hervé Marche, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 919 days.

(21) Appl. No.: 12/623,777

(22) Filed: Nov. 23, 2009

(65) Prior Publication Data
US 2010/0132378 A1    Jun. 3, 2010

(30) Foreign Application Priority Data

Dec. 1, 2008   (FR) ..................................... 08 58175

(51) Int. Cl.
*B64D 27/00* (2006.01)
(52) U.S. Cl.
USPC ............................................ 244/54; 248/562
(58) Field of Classification Search
USPC .................. 244/54, 55; 248/640, 560, 562
See application file for complete search history.

(56) References Cited

U.S. PATENT DOCUMENTS

| | | | | |
|---|---|---|---|---|
| 3,658,314 | A * | 4/1972 | Luzsicza ........................ | 267/121 |
| 4,401,298 | A * | 8/1983 | Eaton et al. ............... | 267/140.13 |
| 4,572,321 | A | 2/1986 | Morita | |
| 4,811,919 | A * | 3/1989 | Jones ............................ | 244/54 |
| 5,197,692 | A * | 3/1993 | Jones et al. ..................... | 244/54 |
| 5,372,338 | A * | 12/1994 | Carlin et al. ..................... | 244/54 |
| 5,762,295 | A * | 6/1998 | McGuire et al. ................ | 244/54 |
| 5,788,372 | A * | 8/1998 | Jones et al. .................... | 267/136 |
| 5,957,440 | A * | 9/1999 | Jones et al. ............... | 267/140.14 |
| 7,063,290 | B2 * | 6/2006 | Marche ........................... | 244/54 |
| 7,083,143 | B2 * | 8/2006 | Whitmer et al. ................ | 244/54 |
| 8,226,028 | B2 * | 7/2012 | Marche ........................... | 244/54 |
| 8,256,750 | B2 * | 9/2012 | Cottrell et al. ................ | 267/136 |
| 2002/0060268 | A1 * | 5/2002 | Smith et al. ..................... | 244/54 |
| 2005/0194493 | A1 * | 9/2005 | Marche ........................... | 244/54 |
| 2005/0269444 | A1 * | 12/2005 | Marche ........................... | 244/54 |
| 2008/0054152 | A1 * | 3/2008 | Maeno et al. ................. | 248/562 |

FOREIGN PATENT DOCUMENTS

| | | |
|---|---|---|
| EP | 0 302 669 A2 | 2/1989 |
| JP | 59-222636 | 12/1984 |
| WO | WO 93/15334 | 8/1993 |
| WO | WO 94/04842 | 3/1994 |
| WO | WO 97/43561 | 11/1997 |

* cited by examiner

Primary Examiner — Benjamin P Lee
(74) *Attorney, Agent, or Firm* — Oblon, Spivak, McClelland, Maier & Neustadt, L.L.P.

(57) ABSTRACT

This invention relates to a force transmission system (50) between a turboprop and an attachment pylon, comprising:

a first and a second force transmission device (52a, 52b) each comprising a first hollow cylinder (54) with an axis (56) that will be made parallel to a first force transmission direction, said first cylinder defining a first space (58) full of a fluid (60) and closed off in a sealed manner at its two opposite ends, by a first damping layer (62) that will bear in contact with a bearing element (66) of the turboprop, and by a second damping layer (64) that will bear in contact with a bearing element (68) of the attachment device, said first and second layers possibly being compressed by the pressure of said fluid; and first means (70) of fluid communication between the two spaces (58, 58).

14 Claims, 7 Drawing Sheets

HYDRAULIC SYSTEM FOR TRANSMISSION OF FORCES BETWEEN AN AIRCRAFT TURBOPROP AND AN ATTACHMENT DEVICE

TECHNICAL FIELD

This invention relates in general to a force transmission system between an aircraft turboprop and a device capable of attaching it under or above an aircraft wing, or to an aft part of the fuselage.

Such a system can be used on any type of aircraft comprising turboprops, such as turboprops capable of outputting a very high power possibly exceeding 10000 horsepower.

STATE OF PRIOR ART

Engines on existing aircraft are suspended under or are mounted above the wing using complex attachment devices called "EMS" (Engine Mounting Structures) working in combination to form an assembly called the engine assembly.

These devices are designed particularly to transmit static and dynamic forces generated by engines such as the weight, thrust or different dynamic forces, to the wing.

In prior art, a turboprop was conventionally suspended under an aircraft wing using an attachment device comprising a rigid structure provided with an aft under-wing box, and one or several rigid segments arranged forwards in sequence along the longitudinal direction of the engine.

In this configuration, each rigid forward segment comprises for example two transverse frames at a spacing from each other and connected together through a plurality of rods and or beams/boxes, as shown in documents EP 1 538 080 B1 and U.S. Pat. No. 7,159,819 B1.

In a known manner, the attachment device comprises means of attaching the turboprop onto the rigid structure, these means normally taking the form of a plurality of so-called flexible attachments, particularly capable of filtering/damping vibrations generated by the propeller of the turboprop. These attachments are usually distributed on a forward frame and an aft frame, the aft frame possibly being added under the under-wing box. For example, there are three or four of them distributed on the forward frame, and two on the aft frame.

Each of these flexible attachments transmits forces relatively flexibly towards the rigid structure in at least two preferred directions. Consequently, the assembly made is fully statically indeterminate, such that the forces at the interfaces depend on the relative flexibility of the engine, the pylon and the fasteners, manufacturing tolerances and differential thermal distortions, which makes it extremely complex to determine them. Furthermore, the statically indeterminate nature of these attachment means can generate difficulties in assembly, and the occurrence of large mechanical stresses.

An alternative solution consists of providing a plurality of hydraulic actuators to replace the flexible attachments. However, these actuators are very large, and require complex attachments for their installation between the rigid structure of the attachment device and the turboprop.

SUMMARY OF THE INVENTION

Therefore, the purpose of the invention is to at least partially remedy the disadvantages mentioned above relative to embodiments in prior art.

To achieve this, the object of the invention is a system for transmission of forces between a turboprop and a device for attachment of said turboprop to an aircraft, said force transmission system comprising:

a first force transmission device and a second force transmission device each comprising a first hollow cylinder with an axis parallel to a first force transmission direction, said first cylinder defining a first space full of a fluid and closed off in a sealed manner at its two opposite ends, by a first damping layer that will bear in contact with a turboprop bearing element, and by a second damping layer that will bear in contact with a bearing element of the attachment device, said first and second damping layers being compressible by the pressure of said fluid, and first means of fluid communication between said two first spaces.

Consequently, the invention proposes an innovative solution for transmitting forces along said first direction between the turboprop and its attachment device.

The fluid present in the first two spaces formed by the first two hollow cylinders respectively, transmits forces along the first direction in two locations corresponding to the locations of the two transmission devices. Preferably, the two transmission devices are at a significant spacing from each other.

Furthermore, the presence of means of fluid communication between the first two spaces firstly allows the first two cylinders full of fluid to remain inoperative in the transmission of forces applied along directions other than said first direction. This makes it easy to design a statically determinate system for resisting forces between the turboprop and its attachment device. Furthermore, fluid communication between the first two spaces balances the forces along the first direction resisted by the first transmission device and the second transmission device respectively. In the case of a load creating larger point forces on the first device, the first and second damping layers associated with the first cylinder tend to penetrate into the first cylinder thus creating an overpressure in the fluid that is automatically transmitted to the fluid in the cylinder of the second device. Consequently, under the effect of this overpressure, the first and second damping layers associated with the cylinder of the second device tend to be compressed between the fluid and their associated bearing elements, this compression usually being accompanied by a displacement of the bearing elements. Then, the forces resisted by the second device become larger than the forces resisted by the first device, and consequently the phenomenon is reversed and then the first and second damping layers associated with the cylinder of the first device are compressed between the fluid and their associated bearing elements, before the phenomenon reverses once again. Damping and therefore energy absorption occurs every time that the layers are compressed, such that after several of the cycles described above, the forces passing through the first and second force transmission devices are quickly balanced.

More generally, the damping layers form means capable of damping turboprop vibrations that might be created, particularly by the propeller. Thus, if turboprop vibrations occur, compression of the layers caused by pressurisation of the fluid also reduces this pressure, and the result is a genuine damping effect.

Furthermore, only one fluid communication is required to resist forces in the first direction, unlike for example with the solution according to prior art using double acting actuators requiring two fluid communications to connect actuator chambers in pairs.

Finally, the adopted design is advantageously compact, making it easy to install the transmission system between the turboprop and its attachment device.

Preferably, several systems according to the invention are implanted between the turboprop and the rigid structure of the attachment device, to obtain a statically determinate assembly. With this statically determinate nature of the assembly, it becomes easy to determine forces at the interfaces and the assembly is considerably simplified, since there are no mechanical stresses.

Note that these hydraulic systems are preferably closed systems, and are passive in the sense that they are not controlled in any way by any actuation means, but on the other hand are only reactive to relative movements of the turboprop.

The first two cylinders, preferably metallic and preferably with a circular cross-section, are arranged at different locations on the turboprop. This makes it possible to distribute the forces on the rigid structure in a desired and predetermined manner, for example on two transverse frames of this structure. Since the pressure encountered within the first two spaces is identical due to their fluid connection, the distribution of forces transmitted by each of the two transmission devices depends on the inside diameter of the hollow cylinders, it being noted that although these forces vary as a function of the applied load, their ratio remains constant.

For information, a distribution may be required in which most forces pass in a transverse plane forward from the rigid structure, and the other passes in an aft transverse plane, in proportions for example such as 80:20.

Preferably, said first and second force transmission devices also comprise a second hollow cylinder with an axis that will be made parallel to a second force transmission direction, said second cylinder defining a second space full of a fluid and closed off in a sealed manner at its two opposite ends, by a first damping layer that will bear in contact with a bearing element of the turboprop, and by a second damping layer that will bear in contact with a bearing element of the attachment device, said first and second damping layers possibly being compressed by the pressure of said fluid, second means of fluid communication being provided between said second two spaces.

Consequently, in this case the transmission system also allows transmission of forces between the turboprop and its attachment device along a second direction, preferably orthogonal to the first. The second two cylinders connected together will operate in a manner similar to that described above for the first two cylinders with respect to forces applied along the second direction.

Even more preferably, said first and second force transmission devices also comprise a third hollow cylinder each with an axis that will be made parallel to a third force transmission direction, said third cylinder defining a third space full of a fluid and closed off in a sealed manner at its two opposite ends, by a first damping layer that will bear in contact with a bearing element of the turboprop, and a second damping layer that will bear in contact with a bearing element of the attachment device, said first and second damping layers possibly being compressed by the pressure of said fluid, third means of fluid communication being provided between said third two spaces.

Consequently, in this case the transmission system can also transmit forces between the turboprop and its attachment device along a third direction, preferably orthogonal to the first and the second directions. The third two cylinders connected together are designed to operate in a manner similar to that described above for the first two cylinders, for forces applied along the third direction.

The resulting transmission system is thus capable of resisting forces in three directions, in the treatment of three degrees of freedom. More generally, it is arranged for at least one of the two devices of the system to have two cylinders with distinct directions, each connected to a cylinder associated with this direction, these associated cylinders belonging or not belonging to the same transmission device. Thus, it must be understood that the system according to the invention may comprise one or several other transmission devices in addition to the above-mentioned first and second transmission devices, each comprising at least one hollow cylinder full of fluid, without going outside the framework of the invention.

Preferably, said first and second damping layers are made from a rubber or elastomer or from any other similar material that can be compressed under the pressure of the fluid that is preferably incompressible, and even more preferably is oil.

Preferably, the dimensions can be reduced by providing said first force transmission device with a first damping block into which each hollow cylinder of the first device is embedded, said first block forming said first and second damping layers of the first device, and said second force transmission device also comprises a second damping block into which each hollow cylinder of the second device is embedded, said second block forming said first and second damping layers of the second device.

This solution becomes remarkable when several hollow cylinders in different directions are embedded within the same block, since the means of attaching the block on the turboprop and the attachment device simultaneously fix each of the embedded cylinders in the block onto the latter two elements.

Preferably, each of said first and second blocks are cubic or parallelepiped in shape.

Another object of the invention is an engine assembly for an aircraft comprising a turboprop and an attachment device of said turboprop on the aircraft, said assembly also comprising one or several force transmission systems according to any one of the previous claims, inserted between said turboprop and said attachment device.

Preferably, said bearing element of the attachment device associated with the first device, said bearing element of the attachment device associated with the second device, said bearing element of the turboprop associated with the first device and said bearing element of the turboprop associated with the second device, are all provided with three bearing surfaces approximately orthogonal to each other and forming a corner. This shape is particularly suitable for the case in which said first and second blocks are cubic or parallelepiped in shape, although it can be used with blocks with other shapes.

Finally, another purpose of the invention is an aircraft comprising at least one engine assembly like that just described above.

Other advantages and characteristics of the invention will become clear in the detailed non-limitative description given below.

BRIEF DESCRIPTION OF THE DRAWINGS

This description will be made with reference to the appended drawings in which.

DETAILED DESCRIPTION OF PREFERRED EMBODIMENTS

Figure 1:
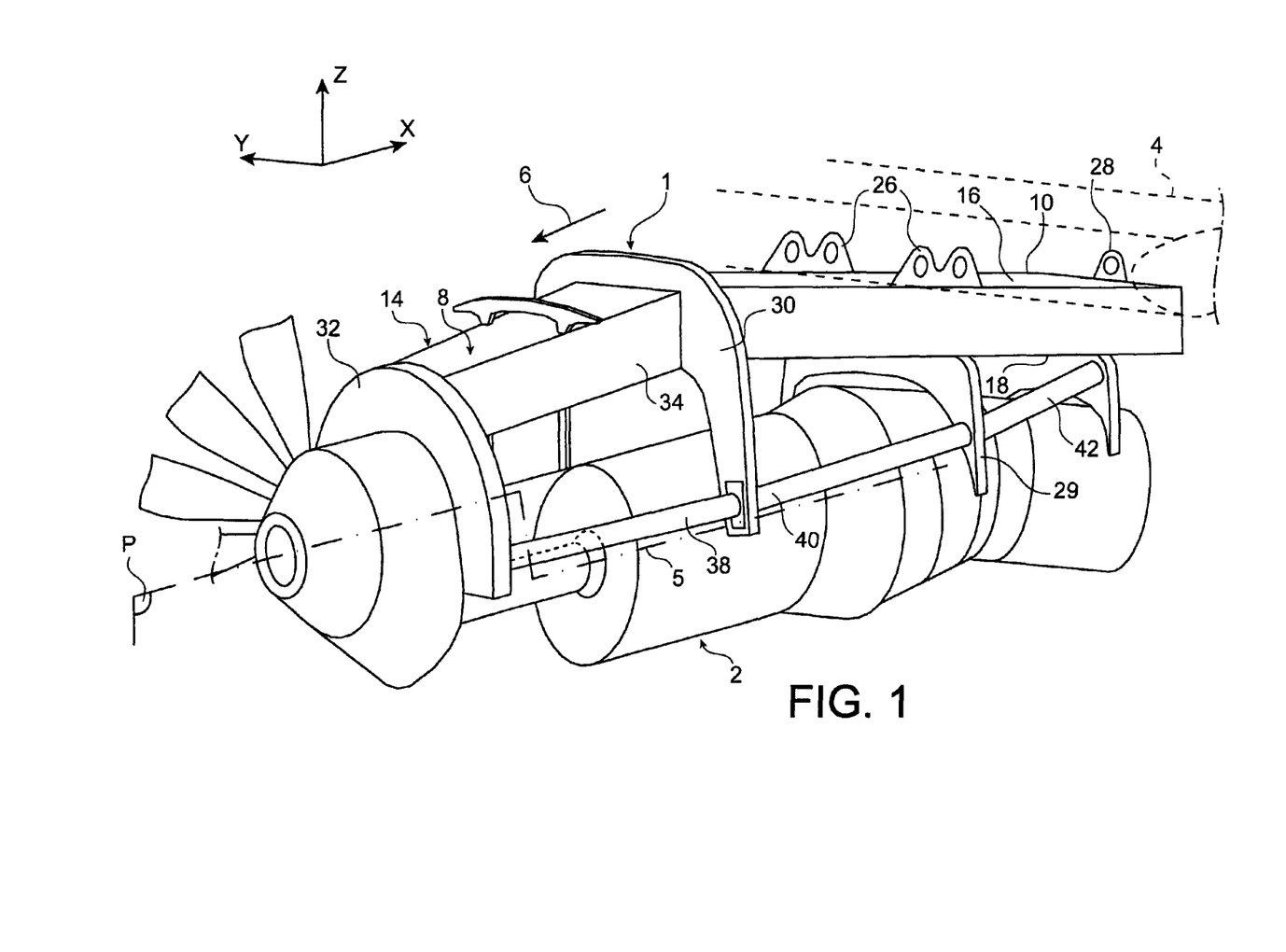
FIG. 1 shows a perspective view of an engine assembly according to a preferred embodiment of this invention, showing a turboprop and the rigid structure of an attachment device of this turboprop.

FIG. 1 shows an engine assembly 100 for an aircraft according to one preferred embodiment of this invention, this assembly 100 globally comprising a turboprop 2 and an attachment device or pylon 1. In this case the device 1 will suspend the turboprop 2 under an aircraft wing shown only diagrammatically for obvious reasons of clarity, and denoted in general by the numeric reference 4.

Throughout the following description, by convention X will denote the direction parallel to a longitudinal axis 5 of the turboprop 2, which will also be equivalent to the longitudinal direction of the pylon 1 and the assembly 100, Y the transverse direction relative to the aircraft and the turboprop 2 and also equivalent to the transverse direction of the pylon 1 and the assembly 100, and Z is the vertical direction or the height, these three directions being orthogonal to each other. Note that the longitudinal axis 5 of the turboprop 2 should be understood as being the longitudinal axis of the engine casing, and not the longitudinal axis of its propulsion propeller (not referenced).

Furthermore, the terms "forward" and "aft" should be considered relative to the direction of movement of the aircraft encountered as a result of the thrust applied by the turboprops 2, this direction being shown diagrammatically by arrow 6.

FIG. 1 only shows one rigid structure 8 of the attachment device 1. The other components (not shown) of this device 1, of the secondary structure type providing segregation and holding the systems while supporting aerodynamic fairings, are conventional elements identical to or similar to those encountered in prior art and known to those skilled in the art. Consequently, no detailed description of them will be made.

In this preferred embodiment of this invention, the rigid structure 8 comprises an aft under-wing box 10 and a forward segment 14, in sequence in the forwards direction along the longitudinal axis 5 of the turboprop 2.

The aft under-wing box 10 is of the same type as those encountered in turboprop attachment devices according to prior art, and well known to those skilled in the art.

For example, this under-wing box 10 may comprise an upper spar 16 and a lower spar 18, each extending approximately along the X direction, these spars 16 and 18 being connected to each other through a plurality of transverse inner ribs (not shown) spaced and arranged in the YZ planes. Nevertheless, as shown in FIG. 1, the spars 16 and 18 could be located in planes slightly inclined from the XY planes.

Furthermore, the under-wing box 10 comprises two side flanges to close the box, each of these two flanges possibly being composed of several plane and vertical flange portions.

Also, as can be clearly seen in FIG. 1, the aft under-wing box 10 has two forward attachments that will attach the device 1 under the aircraft wing 4. For example, each attachment 26 is the form of a fitting extending upwards in an XZ plane from the upper spar 16, at a lateral end of it.

An aft attachment 28 may also be provided to attach the device 1 under the wing 4 jointly with the two forward attachments 26, this attachment 28 then being in the form of a fitting extending upwards in a YZ plane from the upper spar 16, at an aft end of it.

Below the under-wing box 10, the structure 8 comprises one or several transverse frames oriented along the YZ planes. Two aft transverse frames are provided in the embodiment shown, with the frame furthest forward reference 29 being designed to carry some of the attachment means fixed between the turboprop and the rigid structure.

The under-wing box 10 may be closed off at the forward end by a first forward transverse frame 30 located in a YZ plane, this frame 30 preferably being in the general shape of an upside-down U, and also forming an integral part of the forward segment 14.

This forward rigid segment 14 comprises a second transverse frame 32 in association with the first transverse frame 30, also located in a YZ plane and in the form of an upside-down U, its two branches pointing downwards and also being located below its base. Naturally, this upside-down U-shaped configuration has been adopted so that when installed, the turboprop 2 can be arranged between the two branches of each U.

Furthermore, this rigid segment 14 has an upper forward box 34 connecting an upper part of the two transverse frames 30 and 32, and more specifically the two bases of the upside-down U sections formed by these frames 30 and 32 respectively. Note that in this preferred embodiment, a single box 34 connects the upper part of the two transverse frames 30 and 32. Nevertheless, it would naturally be possible to have several forward boxes to connect the upper part of these two frames 30 and 32, without going outside the framework of the invention.

The design of the upper forward box 34 is identical to or similar to that for the under-wing box 10, as shown in FIG. 1.

Still in FIG. 1, it can be seen that the transverse frames 30 and 32 are not only connected through the upper forward box 34, but also through the rods 38, obviously the number of rods not being in any way limitative. These rods 38 are arranged symmetrically about the vertical plane passing through the longitudinal axis 5 of the turboprop 2, this plane P roughly forming a plane of symmetry for the pylon 1 and the assembly 100.

Rods 40, 42 also forming part of the rigid structure 8 also connect the frames 29 and 30 and the aft transverse frames between them.

In the same way as for the aft transverse frame 29, the forward transverse frame 32 forming the forward end of the rigid structure will also be equipped with attachment means to attach the turboprop on the rigid structure. Preferably, these attachment means that are specific to this invention and will now be described with reference to the following figures, are only connected to these two frames 29, 32, and therefore not to any other element of the rigid structure, so that forces are introduced into the structure exclusively through these two forward and aft transverse planes.

In general, the attachment means used comprise one or several hydraulic force transmission systems specific to this invention, cooperating with the bearing elements provided on the turboprop and on the rigid structure 8.

Figure 2:
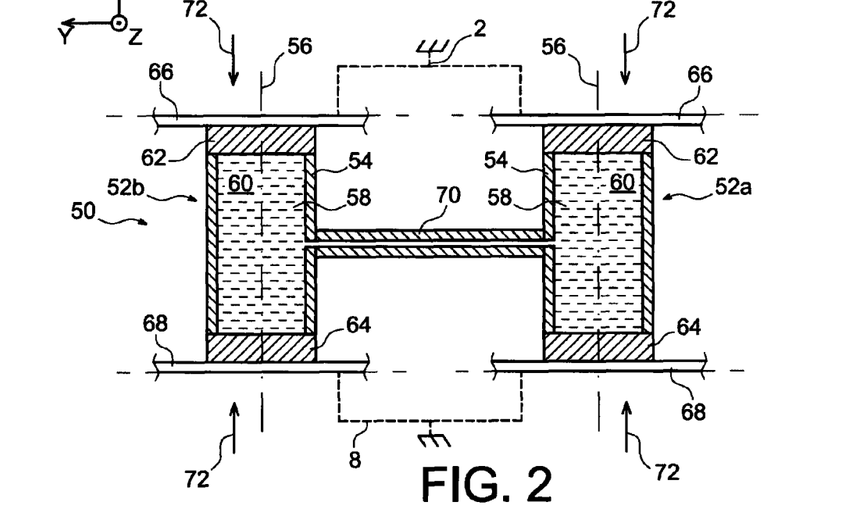
FIG. 2 shows a diagrammatic view of a force transmission system that will be inserted between the turboprop and the rigid structure of the attachment device shown in FIG. 1, this system also being the subject of this invention.

Firstly with reference to FIG. 2, the figure shows one of the hydraulic systems belonging to the attachment means designed to transmit forces along a first direction, in this case the X direction.

The system 50 comprises a first force transmission device comprising a first hollow cylinder with an axis 56 parallel to the first force transmission direction X. It also defines a first space 58 full of a fluid 60, this space being closed off in a sealed manner at one of its ends by a first damping layer 62, and at the opposite end by a second damping layer 64.

Therefore, the first damping layer 62 is in contact with the fluid, and on its opposite surface is in contact with and bearing on a bearing element 66 of the turboprop, and rigidly fixed onto the turboprop. Therefore similarly, the second damping layer 64 is in contact with the fluid, and is in contact with and bearing on a bearing element 68 of the rigid structure 8 on its opposite surface, rigidly fixed on the rigid structure.

Therefore, each layer 62, 64 is fixed to its associated cylinder end, and assures that the fluid 60, preferably oil, is confined into its first space 68 in a sealed manner. The first and second damping layers are preferably made of rubber or elastomer, so that they can be compressed by the fluid pressure as will be described in detail later.

Furthermore, the hollow cylinder 54, preferably metallic and insensitive to the fluid pressure, is preferably circular in cross-section.

As can be seen in FIG. 2, the system 50 also comprises a second force transmission device 52b with a design identical to or similar to that in the first device 52a. Consequently, this second device that is also arranged between a bearing element 66 of the turboprop and a bearing element 68 of the rigid structure 8, will not be described further. However, note that the fluid in these two devices 52a, 52b, present in the first two spaces 58, 58 formed by the first two hollow cylinders 54, 54 respectively, transmits forces along the first X direction, in two separate locations corresponding to the locations of the two transmission devices.

As a result, forces can be distributed onto the rigid structure 8 in a desired and predetermined manner, for example onto two transverse frames of this structure. Since the pressure encountered within the first two spaces 58, 58 is identical due to their fluid connection that will be described later, the distribution of longitudinal forces transmitted by each of the two transmission devices 52a, 52b depends on the inner diameter of the hollow cylinders.

Furthermore, the system 50 comprises first means of fluid communication 70 between the first two spaces 58, these means for example being flexible or rigid pipes or ducts through which oil passes. As can be seen in FIG. 2, these means may be connected to the two cylinders 54, 54 at an opening formed through the lateral wall of these two cylinders.

The arrows 72 represent a first force load case along the X direction, for which the first and second devices 52a, 52b are loaded approximately identically. In this first case, the damping layers 62, may possibly be compressed as a result of slight overpressures in the fluid 60 resulting from vibrations of the turboprop, the compressions observed between the bearing elements 66, 68 and the fluid being such that the pressure in the fluid can quickly be reduced, thus creating genuine vibrational damping.

Figure 3:
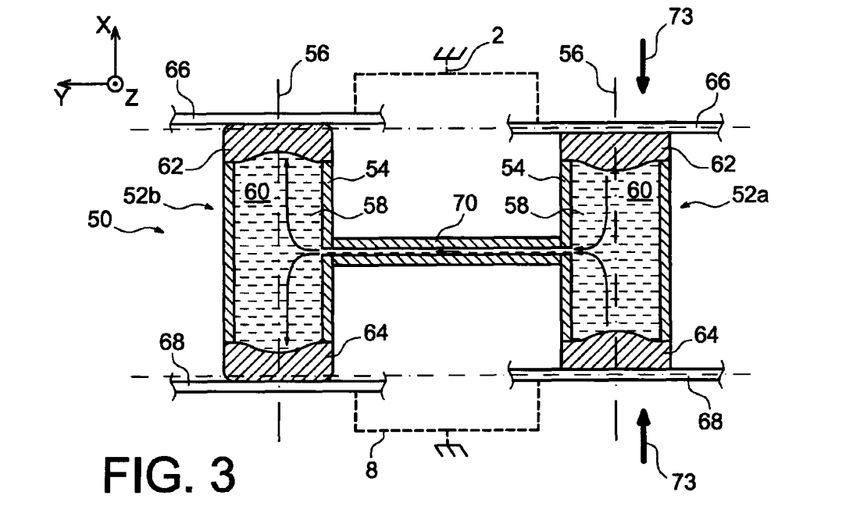
FIG. 3 shows a view similar to that in FIG. 2, the force transmission system being in a configuration in which its first force transmission device is more highly loaded along a first direction than the second force transmission device.

In another case shown diagrammatically in FIG. 3, in which a genuine unbalance is observed between the forces resisted by the first device and the forces resisted by the second device, the fluid communication 70 rebalances these forces applied along the first direction. In the case of a load that creates larger point forces on the first device 52a shown diagrammatically by arrows 73, the first and second damping layers 62, 64 associated with this first device tend to be compressed and then to penetrate into the cylinder 54 slightly under the effect of one of the two bearing elements 66, 68 being brought closer along the first X direction, but noting that the deformation levels of the layers have been deliberately exaggerated in FIG. 3 for reasons of clarity. This penetration of layers 66, 68 into their ends associated with the cylinder creates an overpressure in the fluid 60, which is automatically transmitted to the fluid in the cylinder 54 of the second device 52b, through the communication 70. Consequently, the first and second damping layers 62, 64 associated with the cylinder 54 of the second device 52b tend to be compressed between the fluid and their associated bearing elements 66, 68, under the effect of this overpressure, this compression being achieved by displacement of the fluid beyond the ends of the cylinder, towards the outside of the cylinder and along the X direction. During this compression, the sealed links between the ends of the cylinder and their associated layers are obviously conserved. Furthermore, this compression is usually accompanied by a displacement of the bearing elements 66, 68 along the X direction, moving them apart from each other. For guidance, this displacement takes place when the compression limit of the layers has been reached.

Then, forces resisted by the second device become more important than those resisted by the first device, consequently the phenomenon reverses and the first and second damping layers associated with the first cylinder of the first device will then be compressed between the fluid and their associated bearing elements, before the phenomenon re-inverses once again. Damping occurs every time that the layers 62, 64, are compressed causing energy absorption such that the result after several cycles like those described above is fast balancing of forces passing through the first and second force transmission devices 52a, 52b.

Figure 4:
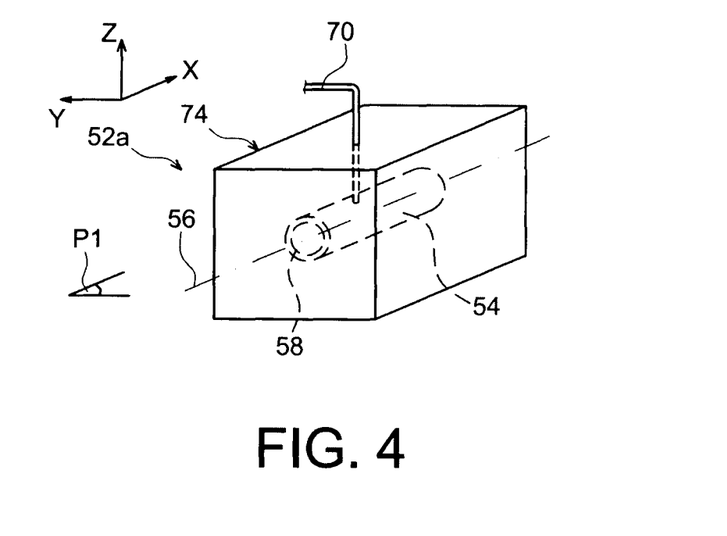
FIG. 4 shows one of the two force transmission devices that can be used on the system shown in FIGS. 2 and 3, the device being in the form of a first alternative embodiment.
Figure 4A:
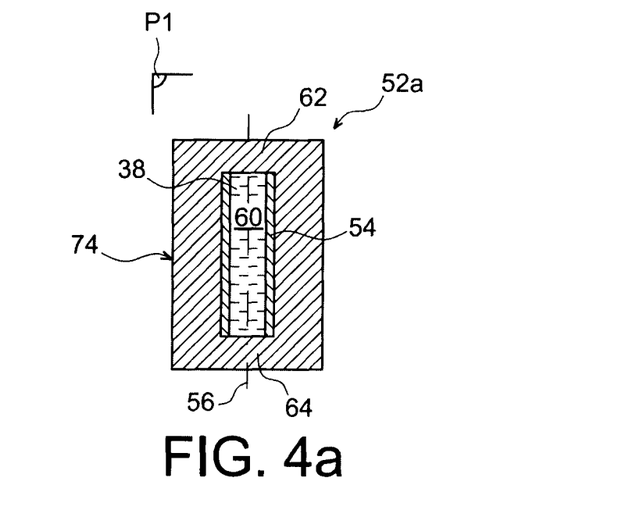
FIG. 4a shows a sectional view taken along plane P1 in FIG. 4, passing through the centre line of the first hollow cylinder.

FIGS. 4 and 4a show a force transmission device according to a first alternative embodiment, designed to form either of the first and second devices described above. We will subsequently assume that it is the first transmission device 52a.

In this case, a damping block 74 is provided in which the first hollow cylinder 54 of the first device is embedded, said first block made of elastomer or rubber and cubic or parallelepiped in shape, each forming first and second damping layers 62, 64 associated with the first cylinder 54 of this first device. Thus, the block 74 not only covers the opposite ends of the cylinder 54, but also its entire lateral wall.

When each of the two devices 52a, 52b is made in this manner, the two blocks 74 are then inserted between a bearing element of the turboprop and a bearing element of the rigid structure, in a manner similar to that shown in FIG. 2, with fluid communication 70 between the first two cylinders 54, 54.

Figure 5:
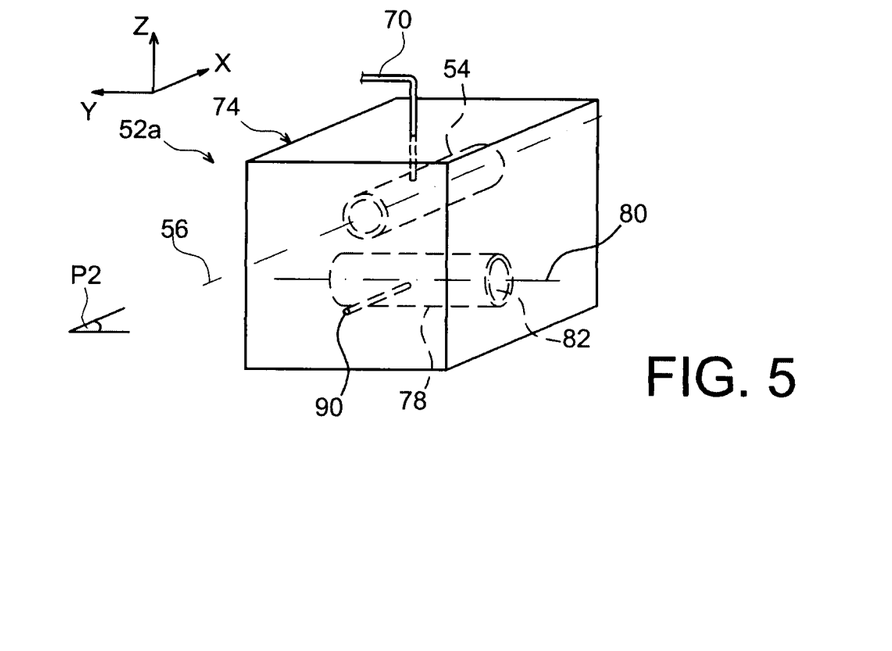
FIG. 5 shows one of the two force transmission devices that can be used on the system shown in FIGS. 2 and 3, the device being in the form of a second alternative embodiment.
Figure 5A:
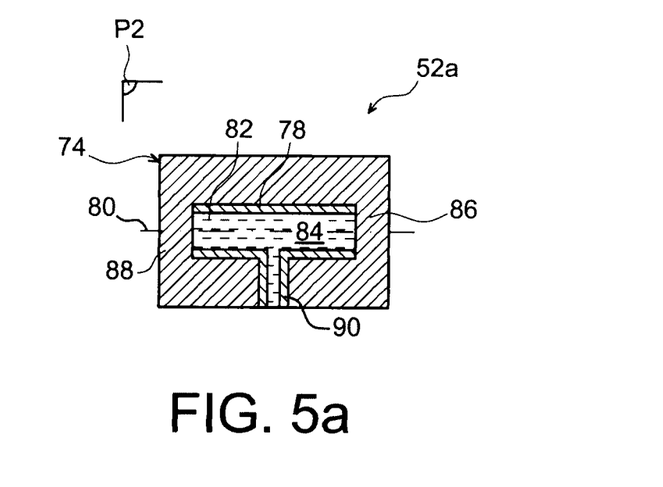
FIG. 5a shows a sectional view taken along plane P2 in FIG. 5, passing through the centre line of the second hollow cylinder.

FIGS. 5 and 5a show a force transmission device according to a second alternative embodiment, designed to form one and/or the other of the first and second devices described above. We will subsequently assume that it is the first transmission device 52a.

In this case, firstly the forces are resisted along the first X direction by the first cylinder 54, but the forces are also resisted along a second direction, namely the Y direction.

This is done by providing a damping block 74 in which the first hollow cylinder 54 of the first device is embedded, as was described above with reference to FIGS. 4 and 4a. Furthermore, a second hollow cylinder 78 with an axis 80 parallel to the second force transmission direction Y is also embedded in this block 74. The cylinder 78 defines a second space 82 full of a fluid 84, this space being closed off in a sealed manner at one of its ends by a first damping layer 86, and at the opposite end by a second damping layer 88.

The first damping layer 86 will come into contact with the fluid and even if it is not shown, on its opposite surface in contact with and bearing on a bearing element of the turboprop, rigidly fixed to the turboprop. Similarly, the second damping layer 88 is in contact with the fluid, and on its opposite surface is in contact with and bearing on a bearing element of the rigid structure, rigidly fixed to the rigid structure.

Therefore each layer 86, 88 formed by the block 74 is fixed to its associated cylinder end and assures that the fluid 84, preferably oil, is confined and sealed in its second space 82. Furthermore, the hollow cylinder 78, preferably metallic and insensitive to the fluid pressure, also has a circular cross-section.

Second means 90 of fluid communication are also provided to connect the two second spaces 82, 82 of the first and second transmission devices, in order to perform the same functions as the first communication means 70 described above, to resist forces applied along the second Y direction.

When each of the two devices 52a, 52b are made in the same way, the two blocks 74 are then inserted between a first bearing element of the turboprop and a bearing element of the rigid structure, in a manner similar to that shown in FIG. 2, with the fluid communication 70 between the first two cylinders 54, 54 and fluid communication 90 between the second two cylinders 78, 78. Naturally, the first cylinders 54, 54 do not communicate with the second cylinders 78, 78, each forming independent hydraulic systems.

Figure 6:
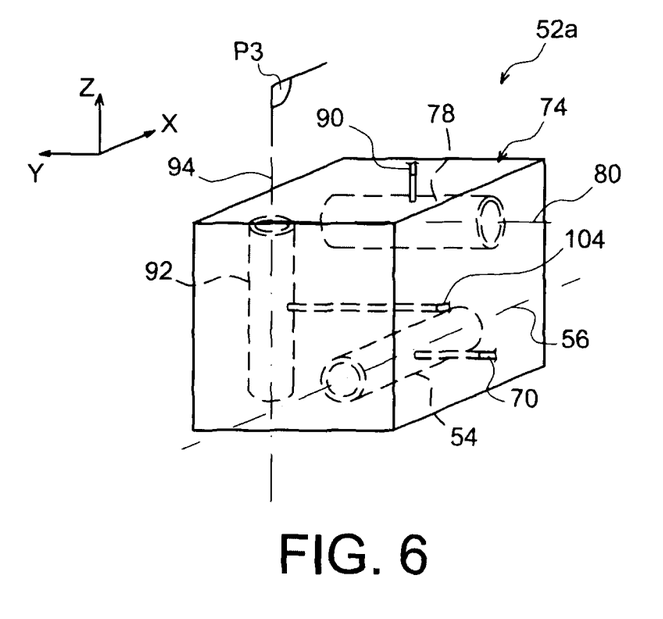
FIG. 6 shows one of the two force transmission devices that can be used on the system shown in FIGS. 2 and 3, the device being in the form of a third alternative embodiment.
Figure 6A:
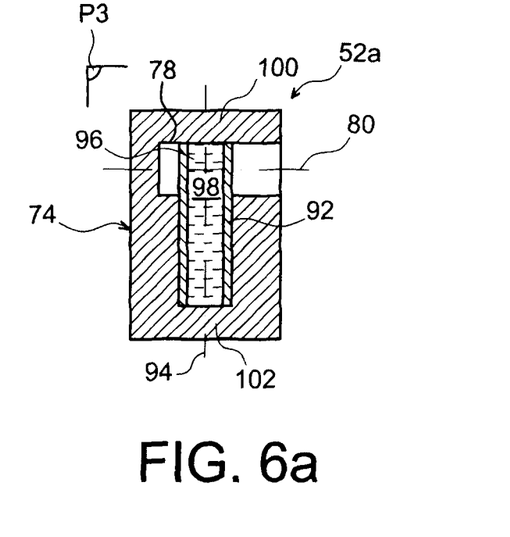
FIG. 6a shows a section view taken along plane P3 in FIG. 6, passing through the centre line of the third hollow cylinder.

FIGS. 6 and 6a show a force transmission device according to a third alternative embodiment designed to form either one and/or the other of the first and second devices described above. In the following, it is assumed that it is the first transmission device 52a.

In this case, it is designed not only to resist forces along the first X direction using the first cylinder 54 and along the second Y direction using the second cylinder 78, but also to resist forces along a third direction, namely the Z direction.

To achieve this, a damping block 74 is provided in which the first hollow cylinder 54 and the second cylinder 78 of the first device are embedded, as described above with reference to FIGS. 5 and 5a. Furthermore, a third hollow cylinder 92 with axis 94 parallel to the third force transmission direction Z is also embedded in this block 74. The cylinder 92 defines a third space 96 full of a fluid 98, this space being closed in a sealed manner at one of its ends by a first damping layer 100, and at the opposite end by a second damping layer 102.

The first damping layer 100 will come into contact with the fluid and even if it has not been shown, on its opposite surface in contact with and bearing on a bearing element of the turboprop, supported rigidly by it. Similarly, the second damping layer 102 is in contact with the fluid and is in contact with and bearing on a bearing element of the rigid structure on its opposite surface, rigidly fixed by the rigid structure.

Therefore each layer 100, 102 formed by the block 74 is fixed at its associated cylinder end and assures that the fluid 98, preferably oil, is confined in its second space 96 in a sealed manner. Furthermore, the hollow cylinder 92, preferably metallic and insensitive to the fluid pressure, also has a circular cross-section.

Third means 104 of fluid communication are also provided here to connect the third two spaces 96, of the first and second transmission devices, in order to perform exactly the same function as the first communication means 70 described above, relative to the forces applied along the third Z direction.

When each of the two devices 52a, 52b is made in this manner, the two blocks 74 are then inserted between a bearing element of the turboprop and a bearing element of the rigid structure, in a manner similar to that shown in FIG. 2, with the fluid communication 70 between the first two cylinders 54, 54, the fluid communication 90 between the second two cylinders 78, 78 and the fluid communication 104 between the third two cylinders 92, 92. Naturally, the third cylinders communicate neither with the second cylinders 78, 78 nor with the first cylinders 54, 54, each forming independent hydraulic systems.

Figure 7:
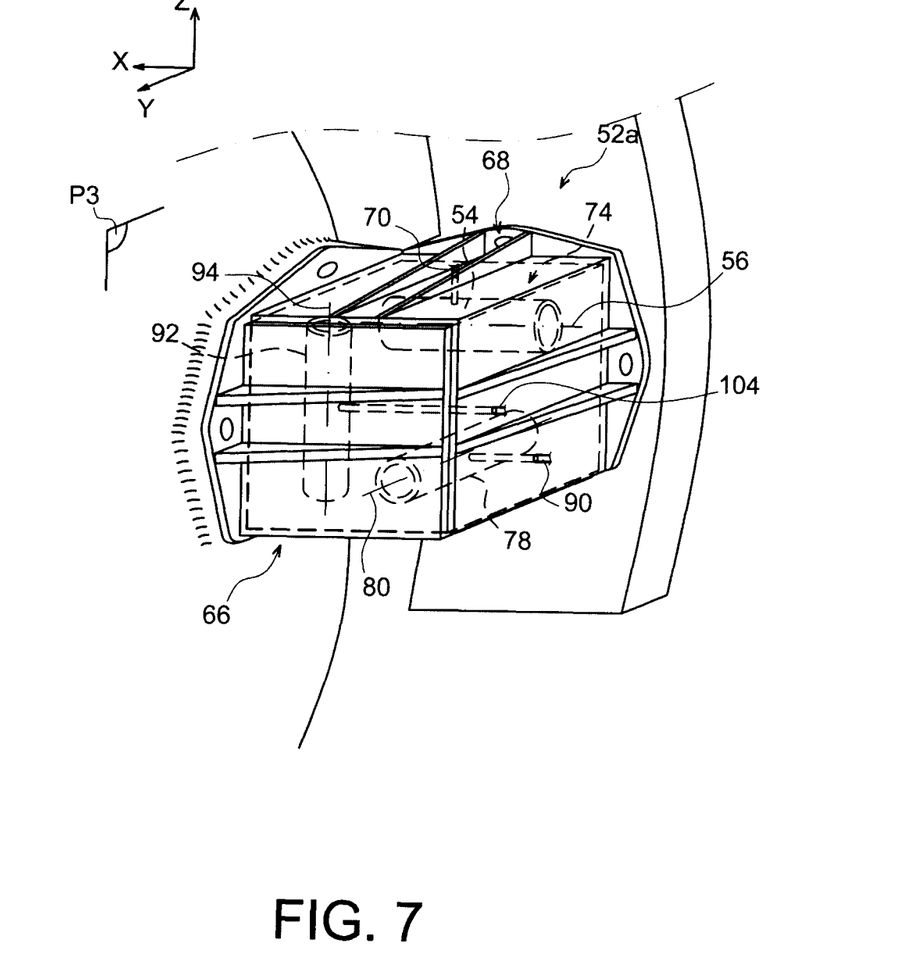
FIG. 7 shows a perspective view of the force transmission device shown in FIGS. 6 and 6a, cooperating with the bearing elements of the turboprop and the attachment device.
Figure 8:
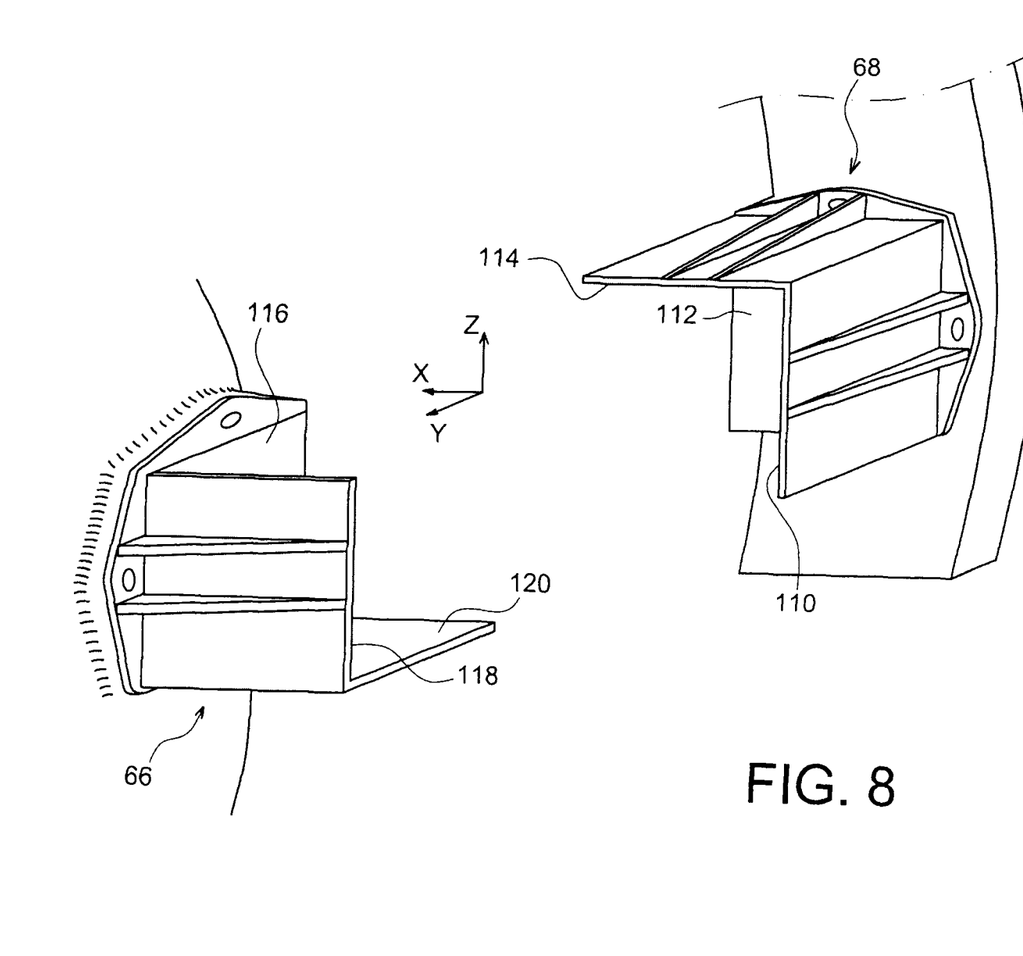
FIG. 8 shows an exploded perspective view of the bearing elements of the turboprop and the attachment device in FIG. 7.

As can be seen in FIGS. 7 and 8, the block 74 of the first device 52a may be associated with a bearing element of the attachment device 68 with three bearing surfaces approximately orthogonal to each other forming a corner, the three surfaces 110, 112, 114, preferably approximately plane, being orthogonal to the axes of cylinders 56, 80, 94 respectively. Similarly, the block 74 of the first device 52a can be associated with a bearing element of the turboprop 66 with three bearing surfaces approximately orthogonal to each other and forming a corner, the three surfaces 116, 118, 120 preferably being approximately plane, being orthogonal to the axes of cylinders 56, 80, 94 and facing the surfaces 110, 112, 114 mentioned above respectively of the bearing element 68.

As shown in FIG. 7, the six surfaces defined by the two elements 66, 68 that will be fixed onto the turboprop and the attachment device, for example by bolting or similar, form a cubic or parallelepiped shaped space, preferably almost closed, in a form complementary to shape of the block 74.

A similar design is made for the second device in the transmission system with two other elements 66, 68, that will be rigidly fixed to different locations on the turboprop and the attachment device.

As mentioned before, the means of attachment of the turboprop onto the rigid structure are formed from several transmission systems 50 and bearing elements 66, 68 cooperating with the devices 52a, 52b of these systems.

Obviously, those skilled in the art can make various modifications to the invention that has just been described, solely as non-limitative examples.

The invention claimed is:
1. A force transmission system between a turboprop and an attachment device of the turboprop on an aircraft, the force transmission system comprising:
  a first force transmission device and a second force transmission device; and
  first means for fluid communication between the first force transmission device and the second force transmission device, wherein each of the first force transmission device and the second force transmission device includes a first hollow cylinder with an axis that is parallel to a first force transmission direction wherein each of the first hollow cylinders has a first space full of a first fluid and is closed off in a sealed manner at two opposite ends thereof by a first damping layer that bears in contact with a bearing element of the turboprop and by a second damping layer that bears in contact with a bearing element of the attachment device, respectively, wherein said first and second damping layers are positioned so as to be compressed by a pressure of said first fluid, and wherein the first means for fluid communication is disposed between said first spaces.

2. The force transmission system according to claim 1, further comprising second means for fluid communication between the first force transmission device and the second force transmission device, wherein each of the first and second force transmission devices further includes a second hollow cylinder with an axis that is parallel to a second force transmission direction, wherein each of the second hollow cylinders has a second space full of a second fluid and is closed off in a sealed manner at two opposite ends thereof by a third damping layer that bears in contact with a bearing element of the turboprop and by a fourth damping layer that bears in contact with a bearing element of the attachment device, respectively, wherein said third and fourth damping layers are positioned so as to be compressed by a pressure of said second fluid, and wherein the second means for fluid communication is disposed between said second spaces.

3. The force transmission system according to claim 2, further comprising third means for fluid communication between the first force transmission device and the second force transmission device, wherein each of the first and second force transmission devices further includes a third hollow cylinder with an axis that is parallel to a third force transmission direction, wherein each of the third hollow cylinders has a third space full of a third fluid and closed off in a sealed manner at two opposite ends thereof by a fifth damping layer that bears in contact with a bearing element of the turboprop and by a sixth damping layer that bears in contact with a bearing element of the attachment device, respectively, wherein said fifth and sixth damping layers are positioned so as to be compressed by a pressure of said third fluid, and wherein the third means for fluid communication is disposed between said third spaces.

4. The force transmission system according to claim 3, wherein the first, second, and third force transmission directions are orthogonal to each other.

5. The force transmission system according to claim 1, wherein the first and second damping layers include rubber or elastomer.

6. The force transmission system according to claim 1, wherein the first force transmission device further includes a first damping block in which the first hollow cylinder of the first force transmission device is embedded, said first damping block forming said first and second damping layers of the first force transmission device, and wherein the second force transmission device further includes a second damping block in which the first hollow cylinder of the second force transmission device is embedded, said second block forming said third and fourth damping layers of the second force transmission device.

7. The force transmission system according to claim 6, wherein each of the first and second damping blocks is cubic or parallelepiped in shape.

8. An aircraft engine assembly comprising:
a turboprop;
a device for attachment of said turboprop on an aircraft; and
at least one force transmission system according to claim 1, inserted between said turboprop and said attachment device.

9. An engine assembly according to claim 8, wherein said bearing element of the attachment device associated with the first force transmission device, said bearing element of the attachment device associated with the second force transmission device, said bearing element of the turboprop associated with the first force transmission device, and said bearing element of the turboprop associated with the second force transmission device, each have three bearing surfaces approximately orthogonal to each other and forming a corner.

10. An aircraft comprising at least one engine assembly according to claim 9.

11. An aircraft comprising at least one engine assembly according to claim 8.

12. The force transmission system according to claim 1, wherein the first fluid is incompressible.

13. The force transmission system according to claim 1, wherein the first fluid is oil.

14. The force transmission system according to claim 1, wherein the first means for fluid communication includes one of flexible pipes, rigid pipes, and ducts.

* * * * *